United States Patent Office 3,237,043
Patented Feb. 22, 1966

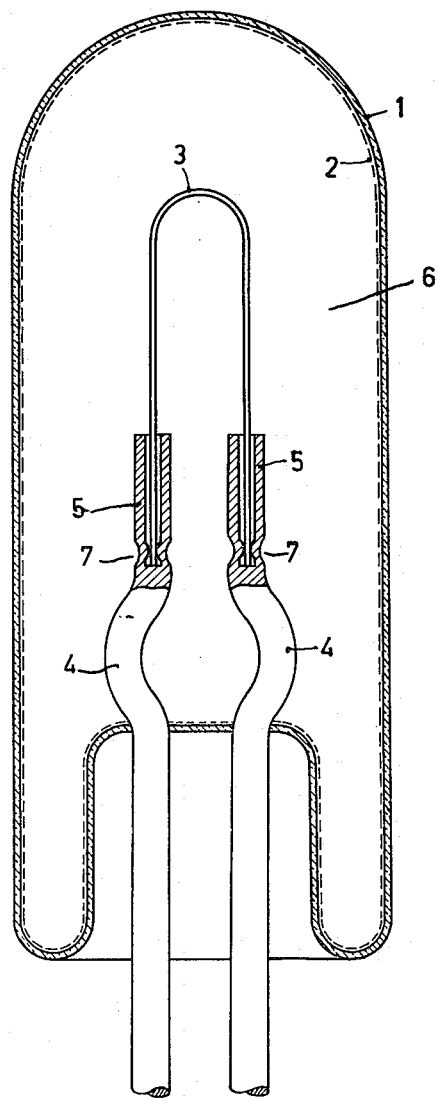

3,237,043
GAS-FILLED ELECTRIC INCANDESCENT LAMP
Johann Schröder, Aachen, Germany, assignor to North American Philips Company, Inc., New York, N.Y., a corporation of Delaware
Filed Oct. 30, 1962, Ser. No. 234,060
8 Claims. (Cl. 313—223)

This invention relates to new and improved electric incandescent lamps which may be operated at high temperatures of the incandescent body and which possess an operating life at these high temperatures, which is long enough to be useful.

Hitherto a great many efforts have been made to manufacture electric incandescent lamps with incandescent bodies consisting of refractory materials possessing higher melting points than tungsten.

With incandescent bodies made of these materials it would namely be possible to obtain higher burning temperatures and hence higher light outputs than with incandescent bodies made of tungsten.

It is an object of the invention to provide an incandescent lamp with an incandescent body consisting of a materal with a melting point which is higher than that of tungsten.

Materials having higher melting points than tungsten and having an electrical conductivity which is sufficient for this purpose may be found among the metal carbides, for example niobium carbide and tantalum carbide.

These materials however decompose already at comparatively low temperatures in vacuo due to decarburation and evaporation of carbon. The glass wall of evacuated incandescent lamps with incandescent bodies consisting of these materials therefore readily blackens and the incandescent body burns through already after a short period.

It has been suggested to provide an incandescent lamp having an incandescent body consisting of tantalum carbide with an atmosphere comprising at operating temperatures a halogen, preferably chlorine hydrogen and vaporized carbon. The amount of carbon in this atmosphere should be sufficient to prevent the tantalum carbide body from decomposing into free tantalum and carbon. Hydrogen and chlorine should be used in varying proportions, it being critical only that enough hydrogen is present to prevent chlorine from attacking the bulb components and that the total amount of hydrogen and chlorine is sufficient to combine with carbon atoms escaping from the region surrounding the incandescent body to reduce to a minimum deposits of uncombined carbon upon the inner wall of the bulb.

This suggestion does not provide an important improvement since hydrogen and chlorine does not react with carbon readily at the relatively low wall temperatures of the lamp. Any deposited carbon therefore will not disappear from the wall and the incandescent body will decarburate gradually. Any carbon compound formed of carbon and chlorine or hydrogen near the incandescent body will decompose because of the high temperature of the body depositing carbon upon the body quite randomly and preferably at the cooler spots of the body. The decomposition namely occurs already at some distance from the body depending on the body temperature. If a relatively cool spot is present on the body, the carbon compound may approach the body more closely before being decomposed. This results in a building up on the cool spots to the exclusion of hotter spots from which carbon continues to be vaporized until the body is eventually burned through.

It is an object of the invention to prevent the burning through of the incandescent body at a hot spot, by providing the lamp with an atmosphere which reacts with the constituents of the incandescent body in such a way that a uniform body temperature is obtained. It is another object of the invention to prevent blackening of the bulb walls by carbon deposits. This may be carried into effect by providing the lamp with an atmosphere consisting at operating temperatures, of carbon, the metal which is present in the carbide the incandescent body is made of, compounds of both with fluorine, and fluorine.

In order that the invention may be readily understood it will now be described in more detail and with reference to the accompanying drawing which shows a section through an incandescent lamp having an incandescent body consisting of tantalum carbide.

Elementary fluorine reacts with carbon and metals already at room temperatures. If some carbon might deposit onto cooler parts such as the bulb walls of the lamp while it is burning, this carbon reacts with fluorine and the resulting fluorine compound e.g. $CF_4$ is added again to the atmosphere. The compounds of carbon and fluorine only dissociate in direct proximity to the hot incandescent body. The partial pressure of the carbon in the atmosphere resulting from the decomposition of the carbon fluorine compound such as $CF_4$ is therefore highest at areas where the dissociation pressure of the compound the incandescent body is made of is also highest, thus at the hot spots of said body. In the lamp atmosphere also an inert gas may be present.

Introducing into the atmosphere an inert gas, such as nitrogen, argon or krypton, permits also the partial pressure of the carbon resulting from the dissociation of the carbon fluoride to be adjusted so as to be equal to the partial pressure of the carbon resulting from the dissociation of the incandescent body. The atmosphere is thus continually recuperated the carbon always being transported in a cyclic process to the hottest areas of the incandescent body. This affords an advantange which is found to be present only in fluorine compounds and in none of the filling gases employed hitherto including chlorine and bromine with or without hydrogen present.

The atmosphere should be substantially free of water and hydrogen, the presence of oxygen in a minor amount being not detrimental while any carbon oxide formed in the lamp will be converted to carbon fluoride in the presence of free fluorine.

Glass is not attacked substantially by anhydrous fluorine or fluorine compounds at moderate temperatures. If however hydrogen or water vapor is present in the lamp hydrogen fluoride may be formed which will readily attack the glass wall of the lamp forming $SiF_4$.

At higher temperature loads it is necessary to protect the glass parts of the lamp against attack by fluorine by means of a thin transparent protective layer of a metal fluoride, such for example as $CaF_2$ or $MgF_2$, which does not vaporize at these temperatures.

Like carbon, metal originating from the metal carbide incandescent body may also deposit on cooler parts of the lamp and react there with fluorine. The metal fluoride will than be transported again in a cyclic process to the hottest parts of the incandescent body. However metal fluorides are generally less volatile than carbon fluoride. Therefore, it is advantageous if the cooler parts of the lamp such as the bulb wall during burning of the lamp could have a temperature which prevents the condensation of metal fluoride such as $NbF_5$ and $TaF_5$. This may be acquired by choosing the dimensions of the bulb so that the bulb has a temperature of at least 100° C. as the lamp is burning. Furthermore it has been found favorable to fill the lamp with a small amount of these metal fluorides before the bulb is sealed.

In the drawing an incendescent body 3 consisting of tantalum carbide is shown which is positioned within an atmosphere 6 consisting at operating temperatures in the order of 3000° C. of carbon, tantalum, compounds of both with fluorine, and fluorine and an inert gas. The components of the atmosphere may be provided by introducing fluorine into the lamp before it is sealed. However, it is preferred to provide the atmosphere by introducing carbon fluoride into the lamp, this compound being easier to handle than fluorine. In a typical embodiment of the invention carbon fluoride is brought in the lamp in such an amount that the partial pressure of it is 5 mm. However, this pressure may also amount to 10 mm. or be less than 5 mm. without failure of the lamp. Furthermore an inert gas such as argon is introduced in an amount to create a partial pressure of 500 mm. However, also lower or higher pressures are possible. The pressure of an inert gas is however not critical.

The supporting and current supply wires 4 are made of nickel.

The ends of the incandescent body, are during burning of the lamp, at a somewhat lower temperature than the remainder of the body due to heat dissipation along the current supply wire. They therefore may be attacked by fluorine. This undesirable attack occurs up to temperatures at which the equilibrium of the reaction

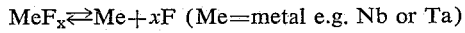

$$MeF_x \rightleftarrows Me + xF \quad (Me = \text{metal e.g. Nb or Ta})$$

still lies on the lift hand side. Thus for example the cooler ends of an incandescent body made of TaC are rapidly attacked by fluorine at temperatures up to 2000° C. and burning through occurs at these places of the body. The ends of the incandescent body must therefore be protected by a fluorine resistant envelope. In the drawing an embodiment of such an envelope is shown: the end parts of the incandescent body are introduced into nickel sleeves 5, which may form one part with the current supply wires 4. The sleeve must surround the incandescent body as tightly as possible without making thermal or electrical contact with the body except at the very ends as shown at 7. The glass bulb 1 is covered with a thin layer 2 of $MgF_2$. The coating may be obtained by evaporating $MgF_2$ in the lamp.

The incandescent body may have any suitable form. It may be made of tantalum carbide or niobium carbide, it may also be made by carburizing of a tantalum or niobium body which is already in the form chosen for the incandescent body.

The current supply and supporting wires may be made of nickel but also copper, aluminum or magnesium may be used. These metals are covered by a thin, dense layer of their fluorides while in contact with fluorine. The metal fluoride layer thus formed prevents any further attack of the underlying metal by fluorine at moderate temperatures so nickel can resist fluorine up to 700° C.

The components of the atmosphere may not only be provided by introducing carbon-fluoride into the bulb before it is sealed but also by introducing the volatile higher homologues of $CF_4$ such as $C_2F_6$, $C_3F_8$ etc.; due to their lower thermal stability, these compounds are rapidly converted into $CF_4$ while setting free carbon which is deposited upon the incandescent body. Even elementary fluorine or a fluorine compound which upon heating dissociates into fluorine and an inert gas may be used. Thus $NF_3$ and other nitrogen fluorides may be introduced into the bulb. The substances used for creating the atmosphere must only be substantially free of hydrogen, for the reasons set forth above.

Tests have shown that the incandescent lamps according to the invention may be operated at temperature of the incandescent body of the order of 3000° C. for extended periods.

It is to be understood, since certain changes may be made in the embodiments of the invention herein described, that the description and the drawing are only illustrative of the invention and are not to be interpreted as limiting the scope of the invention.

What is claimed is:

1. In an incandescent lamp, a filament consisting of a metal carbide positioned within an atmosphere, which at operating temperatures consists substantially of carbon, filament metal vapor, compounds with fluorine of both, and fluorine, said atmosphere being substantially free of hydrogen and water vapor.

2. In an incandescent lamp, a filament consisting of tantalum carbide positioned within an atmosphere which at operating temperatures consists substantially of carbon, tantalum, compounds with fluorine of both, and fluorine, said atmosphere being substantially free of hydrogen and water vapor.

3. In an incandescent lamp, a filament consisting of niobium carbide positioned within an atmosphere which at operating temperatures consists substantially of carbon, niobium, compounds with fluorine of both, and fluorine, said atmosphere being substantially free of hydrogen and water vapor.

4. In an incandescent lamp, a filament consisting of a metal carbide positioned within an atmosphere, which at operating temperatures consists substantially of carbon, filament metal vapor, compounds with fluorine of both fluorine, fluorine and an inert gas, said atmosphere being substantially free of hydrogen and water vapor.

5. In an incandescent lamp, a filament consisting of tantalum carbide positioned within an atmosphere which at operating temperatures consists substantially of carbon, tantalum, compounds with fluorine of both, fluorine, and an inert gas, said atmosphere being substantially free of hydrogen and water vapor.

6. In an incandescent lamp, a filament consisting of niobium carbide positioned within an atmosphere which at operating temepratures consists substantially of carbon, niobium, compounds with fluorine of both, fluorine, and an inert gas, said atmosphere being substantially free of hydrogen and water vapor.

7. In an incandescent lamp, a filament consisting of a metal carbide positioned within an atmosphere, which at operating temperatures consists substantially of carbon, metal vapor, compounds with fluorine of both, and fluorine, the ends of the filament being surrounded by metal envelopes, said atmosphere being substantially free of hydrogen and water vapor.

8. In the manufacture of an incandescent lamp, a filament consisting of a metal carbide positioned within an atmosphere, which at operating temperatures consists substantially of carbon, metal vapor, compounds with fluorine of both, fluorine and an inert gas, the step of introducing into an envelope a gas selected from the group consisting of carbon tetrafluoride and higher homologues thereof, and $NF_3$ and homologues thereof, said gas being substantially free of hydrogen and water vapor.

References Cited by the Examiner

UNITED STATES PATENTS

| | | | |
|---|---|---|---|
| 1,166,464 | 1/1916 | Liebmann | 313—227 X |
| 3,022,438 | 2/1962 | Cooper | 313—223 X |
| 3,022,439 | 2/1962 | Cooper et al. | 313—223 X |

JOHN W. HUCKERT, *Primary Examiner.*

JAMES D. KALLAM, DAVID J. GALVIN, *Examiners.*